Patented May 25, 1954

2,679,505

UNITED STATES PATENT OFFICE 2,679,505

DIRECT ALKYLATION OF TIN

Elliott L. Weinberg, Long Island City, N. Y., assignor to Metal & Thermit Corporation, New York, N. Y., a corporation of New Jersey No Drawing. Application April 24, 1951, Serial No. 222,735

1 Claim. (Cl. 260—429)

The present invention relates to a process of synthesizing organotin halides of the type having the formula $R_2SnX_2$ where R is a univalent alkyl group, X is a halogen of the class consisting of chlorine or bromine.

Organotin halides of the type described have been found particularly useful in the preparation of derivatives serving as stabilizers for chlorinated organic materials such as vinyl chloride resins, chlorinated paraffins, etc. For example, such organotin halides may be employed to make dimethyl tin dilaurate by reaction of the halide with sodium laurate.

One object of the present invention is to provide a process of producing organotin halide compound which lends itself to continuous operation, which avoids "bomb" techniques in which the reactants are enclosed in an enclosed pressurized chamber for an extended period of time, which requires a comparatively short reaction period, which produces high yields per unit time, and which forms a minimum of residues.

In carrying out the process of the present invention, an organic halide of the RX type referred to is reacted with the tin component of a solid contact mass containing a catalyst of the class consisting of copper, gold and silver to form the compound $R_2SnX_2$. More specifically, the organic halide in gaseous or vapor phase is passed through a heated reaction chamber containing a solid mass of copper-tin in alloy form, in intermetallic form or in the form of a mixture of the alloy and the intermetallic compound.

It has been found in accordance with the present invention, that better yields are produced with the lower alkyls below butyl. Moreover, with the higher alkyls, since the halides thereof at room temperature are liquid, a suitable inert gaseous transport such as nitrogen is required to carry the halide over the metallic contact mass. In using such a transport, the gaseous carrier is bubbled through the liquid halide and the resultant gas with the entrained halide is pumped through the reaction chamber.

The invention has been found particularly effective in connection with methyl halides. It has also been found that a temperature in the reaction chamber of 250°–450° C. and desirably 300° C. should be maintained. The solid contact mass should desirably contain a minimum of 40% by weight of copper. Copper-tin alloys or compounds containing less than 40% copper do not remain solid at 300° C. The copper-tin contact mass containing at least 40% copper remains solid in the range of elevated temperatures employed.

At reaction temperatures above 400° C., the alkyl halides begin to decompose thermally.

The pressure in the reaction chamber may range from subatmospheric to superatmospheric. However, atmospheric pressure in the reaction chamber is preferred.

The process of the present invention is desirably carried out as a continuous one. The organic halide is passed through the reaction chamber desirably at a rate equal to consumption, if the halide goes through only once. If the organic halide is recycled either with or without a carrier gas, the flow rate may equal 4 to 5 times the consumption rate.

The effluent gas stream is chilled to condense the organotin halides produced. The unreacted organic halide, if any, emerging from the reaction chamber may be recycled or wasted.

The following examples illustrate certain ways in which the principle of the invention has been applied but these are not to be construed as limiting the broader aspects of the invention.

Example 1

A pound of $Cu_{31}Sn_8$ in solid porous intermetallic compound form produced by sintering of a mixture of the powder ingredients in proper proportions was placed in a Pyrex glass tube. The tube was placed in a tube furnace and was heated to 300° C. While the tube was heating it was flushed with nitrogen or hydrogen to clear out the air. Methyl chloride gas was then passed through the tube at a rate of 25 grams per hour. Methyl tin halides were condensed from the outlet of the tube within 15 minutes. About 160 grams of the product were collected in 3½ hours. This represented an 84% conversion of methyl chloride to dimethyl tin dichloride.

Example 2

A quarter of a pound of $Cu_3Sn$ intermetallic compound powdered to −100 mesh and then briquetted in porous form without a binder was placed in a reaction tube as above and was heated to 300°–325° C. After flushing with nitrogen or hydrogen, methyl chloride gas was passed through the tube while at that temperature at a rate of 245 cubic centimeters per minute. Yields and conversion rates were comparable to those produced in Example 1.

Example 3

A copper-tin alloy containing 60% by weight of tin and 40% of copper in solid particulate form ranging from −5 mm. to −20 mesh in size was packed in the tube in the form of a porous mass. After flushing, methyl chloride gas was passed at a rate of 150 cubic centimeters per minute for 20 hours through the tube heated to 300°–325° C. 380 grams of the product was collected. This corresponded to 46% conversion for the first pass. Yields comparable to Examples 1 and 2 were obtained by recycling the gas.

What is claimed is:

A process of producing dimethyl tin dichloride, which comprises passing methyl chloride in contact with a column containing an alloy comprised of tin and at least 40% copper, said alloy being present as a particulate porous mass and of particle size larger than 20 mesh, at a temperature of about 300° C. and condensing the effluent gas.

References Cited in the file of this patent

UNITED STATES PATENTS

| Number | Name | Date |
|---|---|---|
| 2,444,270 | Rochow | June 29, 1948 |
| 2,625,559 | Smith | Jan. 13, 1953 |

OTHER REFERENCES

Krause: Die Chemie der Metal, Organischen Verbindungen, page 339, Edward Brothers Inc., Ann Arbor, Michigan (1943).